United States Patent
Inagawa

(10) Patent No.: US 7,620,113 B2
(45) Date of Patent: Nov. 17, 2009

(54) SELECTIVELY CHANGING DEMODULATION MODES DEPENDING ON QUALITY OF RECEIVED SIGNAL OR A CONTROL SIGNAL

(75) Inventor: Osamu Inagawa, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 616 days.

(21) Appl. No.: 11/515,001

(22) Filed: Sep. 5, 2006

(65) Prior Publication Data

US 2007/0058741 A1     Mar. 15, 2007

(30) Foreign Application Priority Data

Sep. 14, 2005   (JP)   ............... 2005-267403

(51) Int. Cl.
*H04K 1/10* (2006.01)
(52) U.S. Cl. .................. 375/260; 375/267; 375/299; 375/347
(58) Field of Classification Search ........... 375/260, 375/267, 299, 347; 455/101
See application file for complete search history.

(56) References Cited

U.S. PATENT DOCUMENTS

| | | | | |
|---|---|---|---|---|
| 6,259,721 B1 * | 7/2001 | Uesugi et al. | ............... | 375/130 |
| 7,369,622 B2 * | 5/2008 | Ueno et al. | ............... | 375/267 |
| 7,474,713 B2 * | 1/2009 | Tjahjadi | ............... | 375/324 |
| 7,474,881 B2 * | 1/2009 | Ito et al. | ............... | 455/132 |
| 7,532,686 B2 * | 5/2009 | Nakao et al. | ............... | 375/343 |
| 2008/0253470 A1 * | 10/2008 | Lee et al. | ............... | 375/260 |

FOREIGN PATENT DOCUMENTS

| | | | |
|---|---|---|---|
| JP | 09-275426 A | | 10/1997 |
| JP | 09275426 A | * | 10/1997 |
| JP | 2000-101496 A | | 4/2000 |
| JP | 2000101496 A | * | 4/2000 |

OTHER PUBLICATIONS

Makoto Itami, "Study on Bidirectional High-Speed Transmission by OFDM", Research Report of the Telecommunications Advancement Foundation of Japan, No. 16, P410-418.

* cited by examiner

*Primary Examiner*—Juan A Torres
(74) *Attorney, Agent, or Firm*—Sughrue Mion, PLLC

(57) ABSTRACT

A demodulation apparatus includes a first demodulator for receiving a first received subcarrier and demodulating it by a first demodulation mode, a second demodulator for receiving a second received subcarrier and demodulating it by a second demodulation mode, a third demodulator for demodulating composite subcarriers obtained by combining the first received subcarrier and the second received subcarrier by a third demodulation mode different from the first demodulation mode and the second demodulation mode, and a selector for selecting and outputting demodulation data of one of the first to third demodulators.

23 Claims, 10 Drawing Sheets

SELECTIVELY CHANGING DEMODULATION MODES DEPENDING ON QUALITY OF RECEIVED SIGNAL OR A CONTROL SIGNAL

BACKGROUND OF THE INVENTION

1. Field of the Invention

The present invention generally relates to a demodulation apparatus and a demodulation method for demodulating a received signal with digital modulation and particularly relates to a demodulation apparatus and a demodulation method for selectively changing demodulation modes to use depending on the quality of a received signal or according to a control signal.

2. Description of Related Art

Implementation of Wireless Personal Area Network (WPAN) to enable small scale wireless communication between home electric appliances or equipment for transmitting digital contents (e.g. digital camera) has been recently discussed in IEEE 802.15 Working Group for WPAN TG3a (Task Group 3a WAPAN at High rate PHY) or the like. In the new data communication technique over WPAN, there is required an increase in information transmission speed and reliability for application to transmission of multimedia information. There are also required measures against noise, interference and so on that are caused by transmission over other WPAN devices or the like.

Orthogonal Frequency Division Multiplexing (OFDM) that has high frequency efficiency and high resistance to multipath and that is expected to be applied to WPAN is one type of multicarrier transmission methods. The frequencies of a plurality of subcarriers (sine waves) that form an OFDM symbol are set so that the subcarriers are orthogonal to each other within one symbol duration. The modulation to generate an OFDM signal is performed by Inversed Fast Fourier Transform (IFFT) on the amplitude and phase of each subcarrier using the condition that a plurality of subcarriers are orthogonal on a frequency axis. On the other hand, the demodulation is performed by Fast Fourier Transform (FFT). Further, in OFDM, a guard interval is inserted into a symbol duration to avoid inter-symbol interference.

There are proposed a variety of subcarrier modulation modes including Quadrature Phase Shift Keying (QPSK) and 16 Quadrature Amplitude Modulation (16-QAM). To increase a transmission speed, it is effective to increase the number of bits per symbol. However, the increase in the number of bits by the use of multivalued bits results in a narrower interval between signal points, which reduces resistance to fading, interference wave, noise and so on.

In order to address this concern, adaptive modulation that adapts its modulation mode in accordance with a transmission speed or radio wave conditions is in practical use. Under strong radio wave conditions, this modulation method performs high-speed transmission using a high efficiency modulation mode such as 16-QAM modulation. Under weak radio wave conditions, on the other hand, the method performs signal transmission using a modulation mode that is highly resistant to fading, interference wave and noise, such as QPSK modulation. In this case, it is necessary to change both of the modulation mode used for modulation of a transmitting signal at a transmitting end and the modulation mode used for demodulation of a received signal at a receiving end.

An example of a demodulator using the adaptive modulation method is disclosed in Japanese Unexamined Patent Application Publication No. 09-275426 (FIG. 1). The demodulator selects a circuit to be used for demodulation by switching signal paths with a selector so as to demodulate a QAM modulation signal when an input signal is a QAM modulation signal and demodulate a QPSK modulation signal when an input signal is a QPSK modulation signal. This achieves an integral-type demodulator that is capable of demodulating two kinds of modulation signals in one system.

In the multicarrier transmission methods such as OFDM, the effects of fading, interference wave and noise on each subcarrier are not uniform. Even if the quality of one subcarrier in a plurality of subcarriers significantly deteriorates due to noise originating in a transmission path or the like, the quality of another subcarrier whose frequency is separated from the frequency of the one subcarrier can remain suitable.

As a technique for reducing the effects of frequency selective fading, interference wave, noise and so on using the above characteristics of the multicarrier transmission methods such as OFDM, a frequency diversity technique that transmits the same data through a plurality of subcarriers is known. This technique is described, for example, in Japanese Unexamined Patent Application Publication No. 2000-101496 and Makoto ITAMI, "A Study on Bidirectional High-Speed Transmission by OFDM", Research Report of the Telecommunications Advancement Foundation of Japan, 2001, No. 16, p410-p418.

(See MPEP § 608.01 it is required to delete the embedded hyperlink and/or other form of browser-executable code)

The frequency diversity transmission system that is disclosed in Japanese Unexamined Patent Application Publication No. 2000-101496 is a multicarrier transmission system that includes a transmitter and a receiver to implement frequency diversity. The transmitter simultaneously transmits the same information through two subcarriers having different frequencies. The receiver includes a FFT processor that demodulates two subcarriers transmitted from the transmitter, two data decision circuits that compare data of the channel signals that are obtained by demodulating the two subcarriers, a selector that selects a decision value output from the two data decision circuits and outputs demodulation data, and a decision circuit that compares the decision values output from the two data decision circuits and outputs a selection signal to the selector so as to select the one with a better line quality (i.e. with a low error rate) as demodulation data.

ITAMI discloses an OFDM system to implement frequency diversity. In this OFDM system, a transmitting end transmits the same symbol through a plurality of carriers and a receiving end performs maximum ratio combining thereon for diversity reception.

An object of the invention disclosed in Japanese Unexamined Patent Application Publication No. 09-275426 is to use a common circuit for demodulation to thereby suppress an increase in circuit size. This patent document thus contains no disclosure regarding a technique that a demodulator receives a plurality of transmission subcarriers and, even if the quality of several subcarriers deteriorates due to noise or the like, performs demodulation in accordance with the signal quality to avoid deterioration in the quality of a modulation signal.

A conventional multicarrier transmission using frequency diversity cannot switch demodulation modes used in a receiving end unless switching modulation modes for subcarriers used in a transmitting end or applying different modulation modes to a plurality of subcarriers. Therefore, it requires a large circuit size due to redundancy in a modulator site in a transmitting end, a complicated control mechanism due to the need for transmitting control information to use the same modulation/demodulation mode in a transmitting end and a receiving end, and so on.

As described in the foregoing, the present invention has recognized that a conventional multicarrier transmission using frequency diversity has a drawback that it cannot switch demodulation modes in a receiving end unless switching modulation modes for subcarriers in a transmitting end or applying different modulation modes to a plurality of subcarriers.

SUMMARY OF THE INVENTION

According to a first aspect of the present invention, there is provided a demodulation apparatus which includes a first demodulator for receiving a first received subcarrier with a prescribed frequency range and demodulating the first received subcarrier by a first demodulation mode, a second demodulator for receiving a second received subcarrier with a frequency range different from the prescribed frequency range and demodulating the second received subcarrier by a second demodulation mode, a third demodulator for receiving the first received subcarrier and the second received subcarrier and demodulating a plurality of composite subcarriers obtained by combining the first received subcarrier and the second received subcarrier by a third demodulation mode different from the first demodulation mode and the second demodulation mode, and a selector for selecting and outputting demodulation data of one of the first to third demodulators.

According to a second aspect of the present invention, there is provided a demodulation method which includes receiving a first received subcarrier with a prescribed frequency range and a second received subcarrier with a frequency range different from the prescribed frequency range, demodulating the first received subcarrier by a first demodulation mode, demodulating the second received subcarrier by a second demodulation mode, demodulating a plurality of composite subcarriers obtained by combining the first received subcarrier and the second received subcarrier by a third demodulation mode different from the first demodulation mode and the second demodulation mode, and selecting and outputting demodulation data demodulated by one of the first to third modes.

The use of a demodulation apparatus according to the first aspect of the present invention or a demodulation method according to the second aspect of the present invention enables selection of a demodulation mode for a plurality of received subcarriers in a receiving end without the need for switching modulation modes for subcarriers in a transmitting end or applying different modulation modes to a plurality of subcarriers in a transmitting end. It is thereby possible to perform demodulation in accordance with a signal quality when the quality of a part of subcarriers deteriorates due to noise or the like, for example, so as to avoid deterioration in the quality of a demodulation signal.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Exemplary embodiments of the present invention are described hereinafter with reference to the drawings. In the description of the drawings, the same elements are denoted by the same reference symbols and redundant description may be omitted to clarify the description.

A transmission apparatus that transmits data to be received by a demodulation apparatus of the present invention in a multicarrier transmission system is described hereinafter. The transmission apparatus transmits the same transmission data through a plurality of subcarriers and performs mapping of the same transmission data onto a plurality of different constellations to modulate subcarriers using the plurality of constellations.

Figure 1:
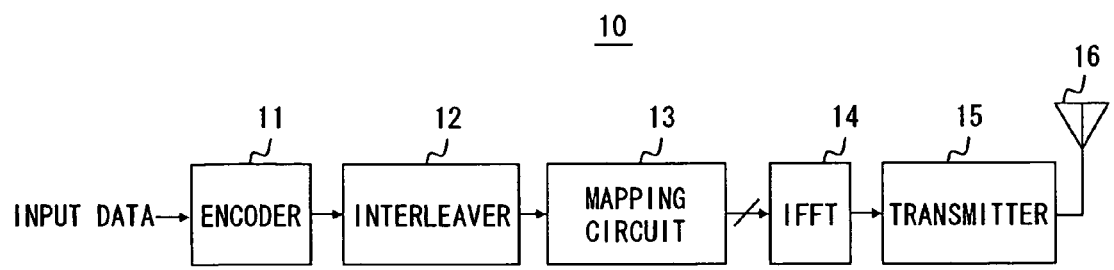
FIG. 1 is a block diagram showing a transmission apparatus according to an embodiment of the invention.

FIG. 1 is a block diagram of a transmission apparatus 10 according to an exemplary embodiment of the present invention. The transmission apparatus 10 maps the same transmission data onto two different constellations and transmits the data through two subcarriers. An encoder 11 performs error correction encoding such as convolution encoding and turbo encoding on input data. The encoded data string is supplied to an interleaver 12. The interleaver 12 performs interleaving to rearrange the bit sequence of the encoded data string received from the encoder 11 in order to make transmission data more resistant against burst error. The data string after the interleaving is supplied to a mapping circuit 13.

Figure 2:
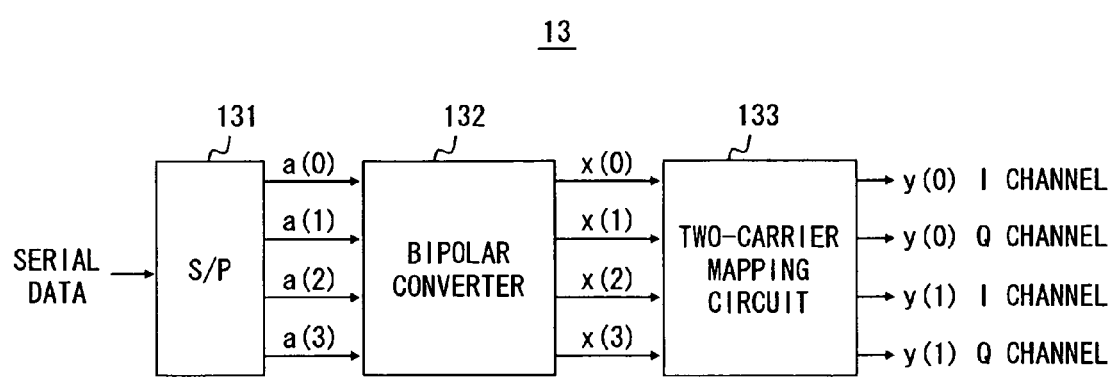
FIG. 2 is a block diagram showing a mapping circuit according to an embodiment of the invention.

The mapping circuit 13 performs parallel data conversion and bipolar conversion on the serial data string supplied from the interleaver 12. Further, the mapping circuit 13 copies the data after the bipolar conversion and maps them onto two different constellations. FIG. 2 shows an exemplary structure of the mapping circuit 13. A serial-parallel converter 131 converts the serial data supplied from the interleaver 12 into N-bit parallel data a(m) where m=0 to N−1. A possible value of a(m) is "1" or "0". The transmission apparatus 10 of this embodiment modulates subcarriers by 16-QAM which allows transmission of 4 bits per symbol. Thus, the serial-parallel converter 131 outputs 4 bits of parallel data a(0) to a(3).

A bipolar converter 132 receives the parallel data a(0) to a(3) and converts them into bipolar signals x(0) to x(3). Table 1 below defines the conversion rule of this embodiment. In this embodiment, an output signal x(m) is "−1" if a(m) is "0", and it is "1" if a(m) is "1". The conversion rule may be determined so as to facilitate the mapping onto constellations in a two-carrier mapping circuit 133 described later, and it is possible to use an opposite conversion rule to the one shown in Table 1.

TABLE 1

| Input signal a(m) | Output signal x(m) |
|---|---|
| 0 | −1 |
| 1 | 1 |

Referring back to FIG. 2, the two-carrier mapping circuit 133 determines signal points of modulation signals corresponding to the input signals x(0) to x(3) by two different constellations for digital quadrature modulation of two subcarriers. The constellation defines the location of signal points that indicate a combination of phase and/or amplitude of an in-phase channel (I channel) and a quadrature channel (Q channel) in digital quadrature modulation mode such as QPSK and 16-QAM. The constellation is normally represented on an IQ plane.

The two-carrier mapping circuit 133 then outputs determined modulation signals y(0) and y(1). The modulation signals y(0) and y(1) output from the two-carrier mapping circuit 133 are represented as complex baseband signals. Specifically, they are the representation of the signal points on the IQ plane as baseband signals using complex numbers, and the real part of a complex number corresponds to the I channel and the imaginary part of a complex number corresponds to the Q channel. The modulation signal is a parameter which defines the phase of a subcarrier in QPSK modulation and defines the phase and amplitude of a subcarrier in QAM modulation. In an IFFT 14 and a transmitter 15 described later, one subcarrier is modulated by the modulation signal y(0) and the other subcarrier is modulated by the modulation signal y(1).

The mapping performed in the two-carrier mapping circuit 133 is described hereinafter in detail. The two-carrier mapping circuit 133 of this embodiment maps one set of parallel data x(0) to x(3) onto two different constellations of 16-QAM and outputs modulation signals y(0) and y(1) that are complex baseband signals. The correspondence between one set of parallel data x(0) to x(3) and the two modulation signals y(0) and y(1) can be expressed by the following Expression 1. The modulation signals y(0) and y(1) can be individually expressed as the following Expressions 2 and 3, respectively.

Expression 1:
$$\begin{pmatrix} y(0) \\ y(1) \end{pmatrix} = \frac{1}{A}\begin{pmatrix} 2 & 1 \\ 1 & -2 \end{pmatrix}\begin{pmatrix} x(0)+jx(2) \\ x(1)+jx(3) \end{pmatrix}$$

Expression 2:
$$y(0) = \frac{1}{A}\{2x(0)+x(1)+j(2x(2)+x(3))\}$$

Expression s3:
$$y(1) = \frac{1}{A}\{x(0)-2x(1)+j(x(2)-2x(3))\}$$

1/A of Expressions 1 to 3 is a coefficient for normalizing the amplitude of a modulated subcarrier to 1. Because the normalization coefficient needs to be taken into consideration in the IFFT 14 and the transmitter 15 that are disposed in the subsequent stages of the mapping circuit 13, the following description omits the consideration of the normalization coefficient.

Figure 3A:
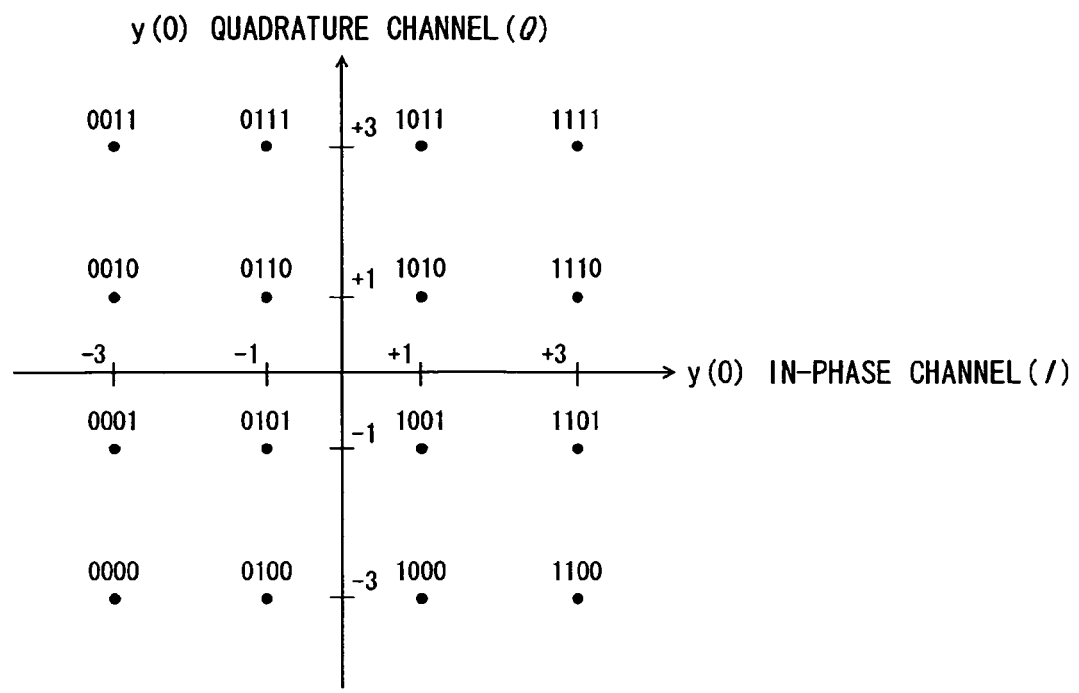
FIGS. 3A and 3B are views showing mapping constellation applied to a mapping circuit according to an embodiment of the invention.
Figure 3B:
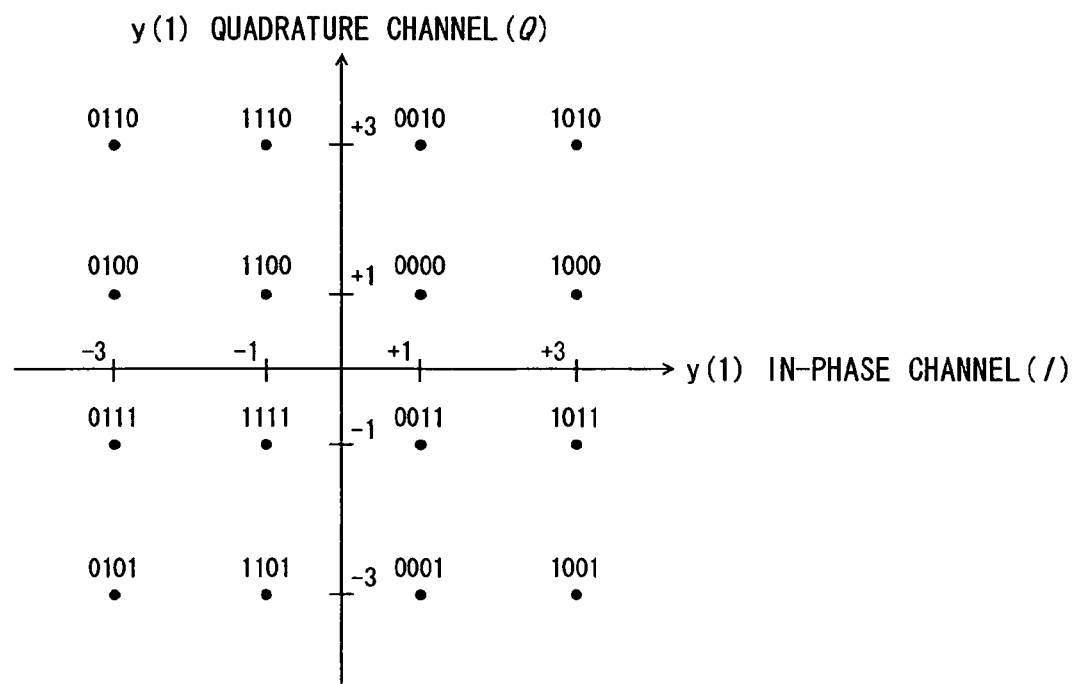

FIGS. 3A and 3B show the constellations of the modulation signals y(0) and y(1), respectively, that are generated in the two-carrier mapping circuit 133. FIGS. 3A and 3B show the mapping rules that are defined by Expressions 2, 3 and Tables 2 to 5 on the IQ plane. The numbers above each signal point in FIGS. 3A and 3B indicate the data a(0) to a(3) before bipolar conversion which correspond to each signal point. The four digits of the numbers indicate each data in the order of "a(0), a(1), a(2), a(3)". For example, the signal point denoted by the numbers "1110" corresponds to the combination of a(0)=1, a(1)=1, a(2)=1, and a(3)=0.

The correspondence between the values of a(0) to a(3) that are input to the bipolar converter 132 and the values of y(0) and y(1) that are output from the two-carrier mapping circuit 133 is shown in Tables 2 to 5 below. Table 2 shows the correspondence between I-channel of y(0) "2x(0)+x(1)" and input data a(0) to a(1). Table 3 shows the correspondence between Q-channel of y(0) "2x(2)+x(3)" and input data a(2) to a(3). Table 4 shows the correspondence between I-channel of y(1) "x(0)−2x(1)" and input data a(0) to a(1). Table 5 shows the correspondence between Q-channel of y(1) "x(2)−2x(3)" and input data a(2) to a(3).

TABLE 2

| a(0) | a(1) | x(0) | x(1) | y(0) I channel |
|---|---|---|---|---|
| 0 | 0 | −1 | −1 | −3 |
| 0 | 1 | −1 | 1 | −1 |
| 1 | 0 | 1 | −1 | 1 |
| 1 | 1 | 1 | 1 | 3 |

TABLE 3

| a(2) | a(3) | x(2) | x(3) | y(0) Q channel |
|---|---|---|---|---|
| 0 | 0 | −1 | −1 | −3 |
| 0 | 1 | −1 | 1 | −1 |
| 1 | 0 | 1 | −1 | 1 |
| 1 | 1 | 1 | 1 | 3 |

TABLE 4

| a(0) | a(1) | x(0) | x(1) | y(1) I channel |
|------|------|------|------|----------------|
| 0    | 1    | −1   | 1    | −3             |
| 1    | 1    | 1    | 1    | −1             |
| 0    | 0    | −1   | −1   | 1              |
| 1    | 0    | 1    | −1   | 3              |

TABLE 5

| a(2) | a(3) | x(2) | x(3) | y(1) Q channel |
|------|------|------|------|----------------|
| 0    | 1    | −1   | 1    | −3             |
| 1    | 1    | 1    | 1    | −1             |
| 0    | 0    | −1   | −1   | 1              |
| 1    | 0    | 1    | −1   | 3              |

The use of Expressions 2, 3 and Tables 2 to 5 allows determination of modulation signals y(0) and y(1) that correspond to data x(0) to x(3) For example, if bits (a(0), a(1)) are (0, 0), the output (x(0), x(1)) of the bipolar converter 132 is (−1, −1). Thus, using Expression 2, the real part or I channel of y(0) is calculated as −3. Further, if bits (a(0), a(1)) are (0, 0), the output (x(0), x(1)) of the bipolar converter 132 is (−1, −1), and the real part or I channel of y(1) is calculated as 1 using Expression 3.

In this way, the I channels of the transmission subcarriers y(0) and y(1) can be calculated from the values of bits (a(0), a(1)) using Expressions 2 and 3. Consequently, the IFFT 14 and the transmitter 15 can modulate the I channels of two subcarriers by 16-QAM.

If there is no distortion in a transmission path caused by noise or fading, it is possible to determine transmitted bits (a(0), a(1)) uniquely from the I-channel of a received subcarrier in receiving end.

For example, if the I channel of the modulation signal Y(0) that is obtained from one subcarrier received is −3, the bits (a(0), a(1)) are determined as (0, 0). Similarly, if the I channel of the modulation signal Y(1) that is obtained from the other subcarrier received is 1, the bits (a(0), a(1)) are determined as (0, 0). Thus, it is possible to double the decision on the same bits (a(0), a(1)) using the I channels of the modulation signals Y(0) and Y(1) that are obtained from two subcarriers. This is the same for the decision on other bits (a(2), a(3)). In this way, the reliability of bit decision can increase by transmitting the same data through a plurality of subcarriers.

The function of the two-carrier mapping circuit 133 described above can be implemented by hardware or software. In implementation by software, it is feasible to retain the correspondence rule of the input bipolar signals x(0) to x(3) and the I channel and Q channel of the modulation signals y(0) and y(1) shown in Tables 2 to 5 and output a value corresponding to a combination of input data, or determine an output value by arithmetical operation using an input value.

Referring back to FIG. 1, the operation of the inversed fast Fourier transformer (IFFT) 14 and the transmitter 15 is described hereinafter. The IFFT 14 receives two modulation signals y(0) and y(1) from the mapping circuit 13. Though the description is particularly given on the modulation of two subcarriers to facilitate the description, the IFFT 14 receives modulation signals that regulate the phases of other subcarriers in similar fashion. The IFFT 14 combines each subcarrier by discrete Fourier transform based on the parameter of the phase and amplitude that are regulated by the input modulation signals y(0) and y(1) or the like and outputs information on a discrete signal change on a time axis. Further, the IFFT 14 serializes data from two outputs of an in-phase component (I channel) and a quadrature component (Q channel) of the carrier for which subcarriers are combined along the time axis and outputs the serial data to the transmitter 15.

The transmitter 15 adds a pilot signal for estimating a transmission path in a demodulation apparatus in a receiving end and inserts a guard interval for avoiding inter-symbol interference to the signal supplied from the IFFT 14. The transmitter 15 further performs D/A conversion and RF modulation on the signal and outputs the result to an antenna 16.

As described in the foregoing, the transmission apparatus 10 uses two different constellations for the same transmission data and generates a transmission signal using a first subcarrier and a second subcarrier. This enables transmission of a signal that is highly resistant to noise and fading because even if the quality of either one of the first subcarrier or the second subcarrier deteriorates on a transmission path due to noise, fading and so on, the quality of the other subcarrier is not likely to deteriorate.

Figure 4:
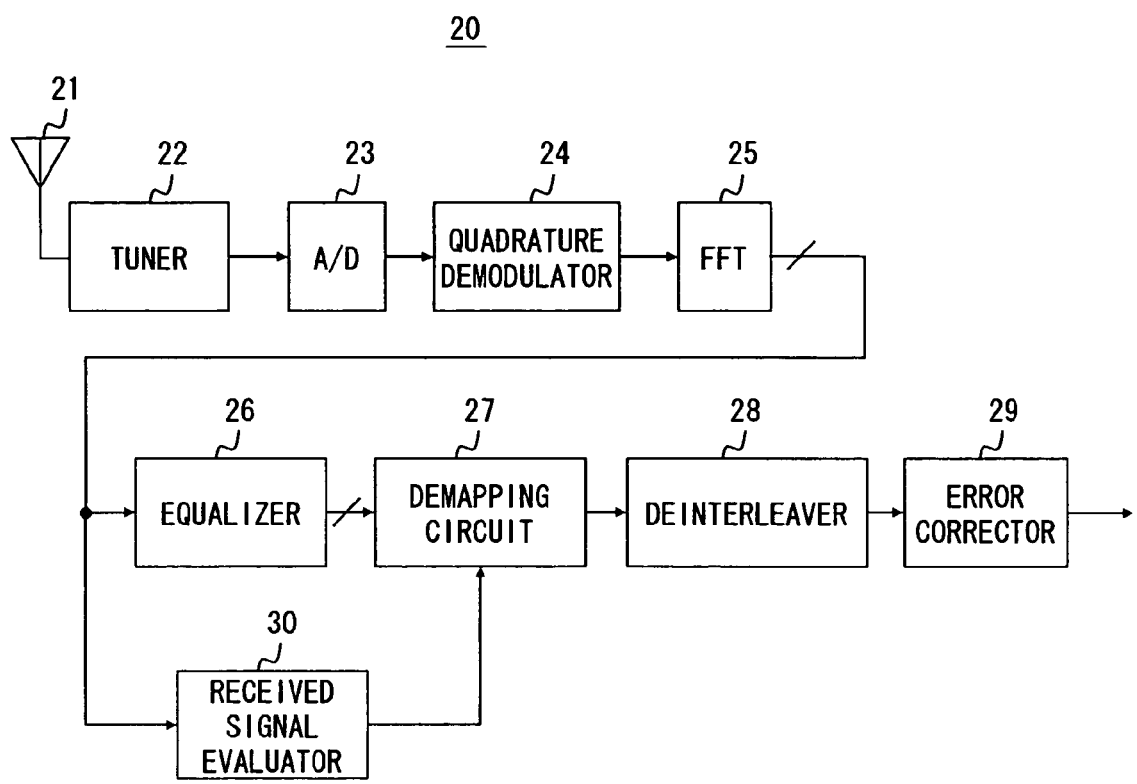
FIG. 4 is a block diagram showing a demodulation apparatus according to an embodiment of the invention.

A structure of a demodulation apparatus according to an embodiment of the invention is described hereinafter in detail with reference to FIG. 4. FIG. 4 is a circuit block diagram showing a demodulation apparatus 20 of this embodiment. In FIG. 4, the antenna 21 receives a transmission subcarrier that is transmitted from the transmission apparatus 10 of this embodiment shown in FIG. 1. A tuner 22 amplifies and frequency-converts the RF signal from the antenna 21 into an IF signal and outputs the IF signal to an A/D converter 23. The A/D converter 23 converts the IF signal supplied from the tuner 22 into a discrete digital signal.

A digital quadrature demodulator 24 quadrature-demodulates the digitized IF signal using a two-phase carrier signal to generate a baseband OFDM signal and supplies the signal to a fast Fourier transformer (FFT) 25. The baseband OFDM signal is a signal in the time domain and it is a complex signal composed of an in-phase component (I channel) corresponding to a real part of a complex number and a quadrature component (Q channel) corresponding to an imaginary part of a complex number.

The FFT 25 receives the baseband OFDM signal from the digital quadrature demodulator 24 and performs discrete Fourier transform to generate a signal in the frequency domain composed of I channel and Q channel. For example, if the transmission subcarrier from the transmission apparatus 10 shown in FIG. 1 is modulated by 16-QAM, the FFT 25 generates a signal that is quadrature-amplitude-modulated by 16-QAM.

An equalizer 26 corrects the effect of multipath fading or the like on a transmission path and supplies the corrected complex signal to a demapping circuit 27. Specifically, the equalizer 26 corrects the phase and amplitude of each subcarrier that is FFT-operated and extracted on the basis of the phase and amplitude of a received pilot signal and/or pilot data that is composed of a known symbol in a data frame transmitted through each subcarrier, thereby equalizing the phase and amplitude.

A received signal evaluator 30 evaluates the quality of an output signal from the FFT 25 or extracts a control signal superposed with a received signal. Exemplary ways for quality evaluation are described herein. One method is to evaluate the quality using a signal to noise ratio SIN of a received signal. For example, if a vector S is a vector of an ideal signal and a vector S' is a vector of an actually received signal, a noise vector N is N=S'−S. At this time, S/N can be represented by the following Equation 4 where A is a constant. The quality of a received signal can be evaluated using Expression 4.

Expression 4:
$$S/N = 10 \log \frac{|S|^2}{|N|^2}$$

The received signal evaluator 30 calculates S/N of received subcarriers that correspond to two transmission subcarriers transmitted from the transmission apparatus 10 and determines which received subcarrier is to be used for demodulation based on the value of the S/N of the two received subcarriers having separated frequencies. If a difference or ratio of the S/N of two received subcarriers with separated frequencies is large, the received signal evaluator 30 controls a demapping circuit 27 so as to select one received subcarrier with suitable S/N for demodulation. If, on the other hand, the S/N values of two received subcarriers are nearly equal, the received signal evaluator 30 controls the demapping circuit 27 so as to use both received subcarriers for demodulation.

Another method is to evaluate the reception quality of each subcarrier without using S/N. For example, the received signal evaluator 30 may simply determine that the reception quality is higher as the received power of received subcarrier is larger and control the demapping circuit 27 so as to use one subcarrier with suitable quality for demodulation.

Another method to control the operation of the demapping circuit 27 multiplexes information about transmission environments with a transmission signal and transmits the signal from the transmission apparatus 10 shown in FIG. 1 or another device, decodes the information in the received signal evaluator 30, and outputs the decoded signal to the demapping circuit 27. For example, if conditions such as frequent or infrequent occurrence of interference in a specific period of time are known in advance, it is possible to multiplex information about the interference with a transmission signal. In this case, the received signal evaluator 30 decodes the information about occurrence time of interference and outputs the result to the demapping circuit 27. The demapping circuit 27 selects a demodulation mode from 64-QAM demodulation, 16-QAM demodulation and QPSK demodulation in this order of precedence, for example, so as to minimize the values of multivalued attributes per symbol in accordance of degree of interference to thereby avoid deterioration in quality of demodulation data. The method of inputting information about transmission environments into the demodulation apparatus 20 is not limited to the above method of multiplexing information with a transmission signal from the transmission apparatus 10 or the like. For example, the information may be input to the demodulation apparatus 20 through another individual transmission path or may be directly set by a user. Further, instead of the information about transmission environments, a control signal for indicating selection of a modulation mode in the demapping circuit 27 may be input.

Referring again to FIG. 4, the demapping circuit 27 refers to the output signal from the received signal evaluator 30 and demodulates the signal after the distortion of amplitude and phase is corrected in the equalizer 26 by a different modulation mode such as QPSK modulation, 16-QAM modulation and so on which maximizes the quality of a demodulation signal.

Figure 5:
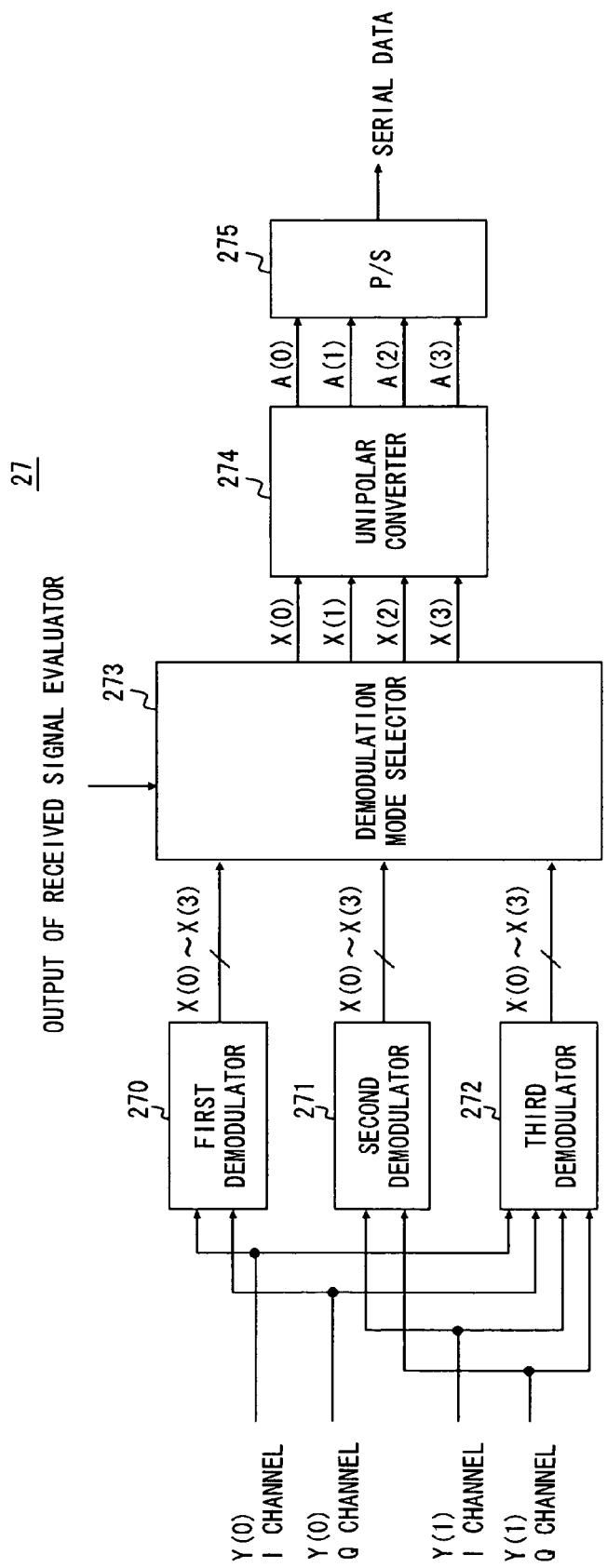
FIG. 5 is a block diagram showing a demapping circuit according to an embodiment of the invention.

The demapping circuit 27 is detailed herein. FIG. 5 is a block diagram showing the demapping circuit 27 according to this embodiment. A first demodulator 270 receives a first modulation signal Y(0) that indicates the phase and amplitude of a first received subcarrier, demodulates it and outputs 4-bit demodulation data X(0) to X(3) to a demodulation mode selector 273. Similarly, a second demodulator 271 receives a second modulation signal Y(1) that indicates the phase and amplitude of a second received subcarrier, demodulates it and outputs 4-bit demodulation data X(0) to X(3) to the demodulation mode selector 273. A third demodulator 272 receives both the first modulation signal Y(0) and the second modulation signal Y(1), combines them, and outputs 4-bit demodulation data X(0) to X(3) to the demodulation mode selector 273 using the composite signal.

The demodulation mode selector 273 receives an output signal from the received signal evaluator 30, selects modulation data of the first demodulator 270, the second demodulator 271 or the third demodulator 272 in accordance with the output signal. The demodulation mode selector 273 outputs selected 4-bit demodulation data X(0) to X(3) to a deinterleaver 28.

If the demodulation mode selector 273 receives a decoded signal containing information about transmission environments described above from the received signal evaluator 30, it selects either of output data that is demodulated by the three demodulation modes based on the signal.

If the demodulation mode selector 273 receives S/N values of received subcarriers from the received signal evaluator 30, it selects one of output data that is demodulated by the three demodulation modes in accordance of the result of evaluating the values of S/N. A specific operation of this case is detailed later.

The demapping circuit 27 may control the operation of only selected ones of the first to third demodulators 270 to 272 and stop the operation of unselected demodulators to thereby reduce power consumption.

An unipolar converter 274 in the demapping circuit 27 converts bipolar signals X(0) to X(3) into unipolar signals A(0) to A(3). A parallel-serial converter 275 converts the parallel data A(0) to A(3) into serial data and outputs the result to the deinterleaver 28.

Figure 6:
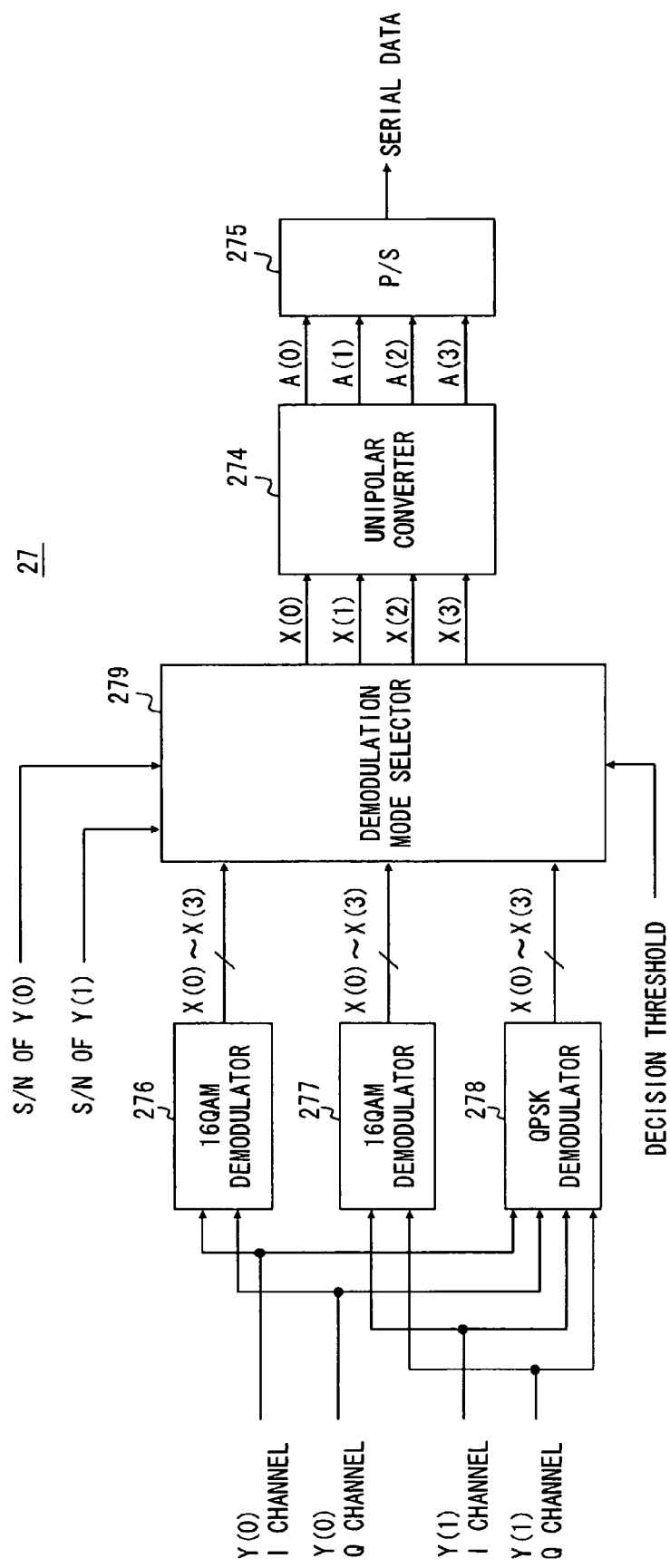
FIG. 6 is a block diagram showing a demapping circuit according to an embodiment of the invention.

FIG. 6 is a block diagram showing a more specific structure of the demapping circuit 27. 16-QAM demodulators 276 and 277 correspond to the first demodulator 270 and the second demodulator 271, respectively. A QPSK demodulator 278 corresponds to the third demodulator 272.

The 16-QAM demodulator 276 receives a first modulation signal Y(0) that indicates the phase and amplitude of a first received subcarrier, performs 16-QAM demodulation and outputs 4-bit demodulation data X(0) to X(3) to a demodulation mode selector 279. The demodulation mode selector 279 corresponds to the demodulation mode selector 273. The 16-QAM demodulator 277 receives a second modulation signal Y(1) that indicates the phase and amplitude of a second received subcarrier, performs 16-QAM demodulation and outputs 4-bit demodulation data X(0) to X(3) to the demodulation mode selector 279. The QPSK demodulator 278 receives both the first modulation signal Y(0) and the second modulation signal Y(1), combines them, and performs QPSK demodulation on the composite signal, and outputs 4-bit demodulation data X(0) to X(3) to the demodulation mode selector 279.

The demodulation mode selector 279 receives a first S/N value for a first received subcarrier and a second S/N value for a second received subcarrier that are output from the received signal evaluator 30. If a difference or ratio of the two S/N values is larger than an input decision threshold, the demodulation mode selector 279 selects the demodulation data that is obtained by demodulating a signal with better S/N. For example, if the first S/N value is better than the second S/N value, the demodulation mode selector 279 selects the demodulation data from the 16-QAM demodulator 276. This method enables demodulation of the data modulated to a plurality of subcarriers with different frequencies with a suitable quality.

Because the first received subcarrier and the second received subcarrier are separated from each other on a frequency axis, the signal quality of the two subcarriers is not likely to deteriorate at the same time. Therefore, with the demodulation using either one received subcarrier having suitable S/N, the demapping circuit 27 of this embodiment can perform demodulation with high reception quality.

On the other hand, if a difference or ratio of the first S/N value and the second S/N value is equal to or smaller than an input decision threshold, the demodulation mode selector 279 selects the demodulation data that is supplied from the QPSK demodulator 278 so as to perform demodulation by a QPSK demodulation mode. The QPSK demodulation mode combines the first received subcarrier and the second received subcarrier, and it is less affected by the deterioration of S/N compared with the 16-QAM demodulation mode. The demodulation apparatus 20 can thereby perform suitable demodulation by suppressing deterioration in signal quality when the same level of quality deterioration occurs in the two received subcarriers.

Figure 7:
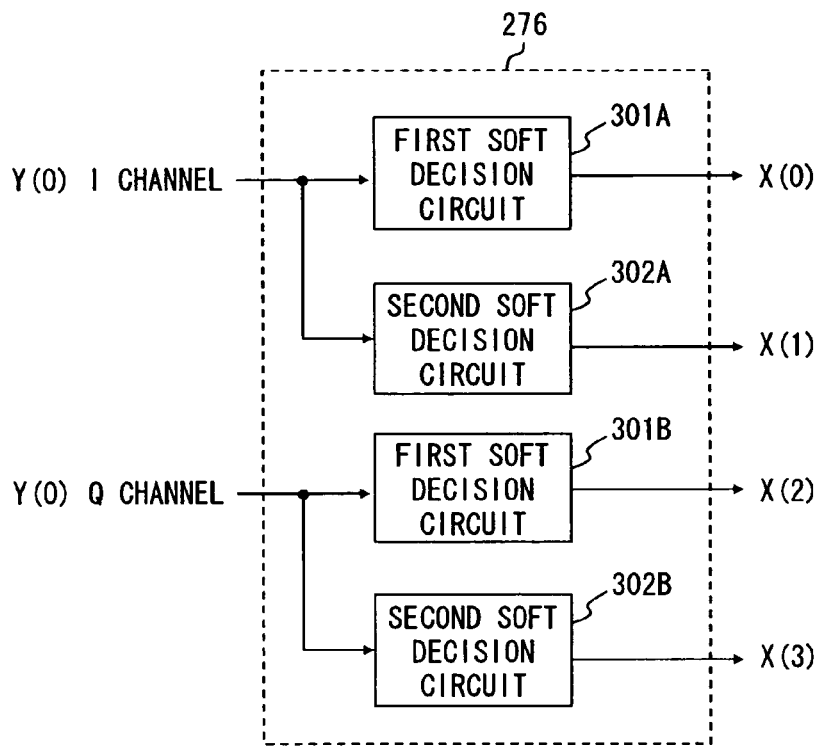
FIG. 7 is a block diagram showing a QAM demodulator according to an embodiment of the invention.

The detail of demodulation by the 16-QAM demodulators 276, 277 and the QPSK demodulator 278 is described below. FIG. 7 is a block diagram showing the 16-QAM demodulator 276. A first soft decision circuit 301A receives the I channel of the first modulation signal Y(0) and decides the code of the demodulation data X(0) using a decision accuracy of a bipolar signal shown in FIG. 10.

Figure 13:
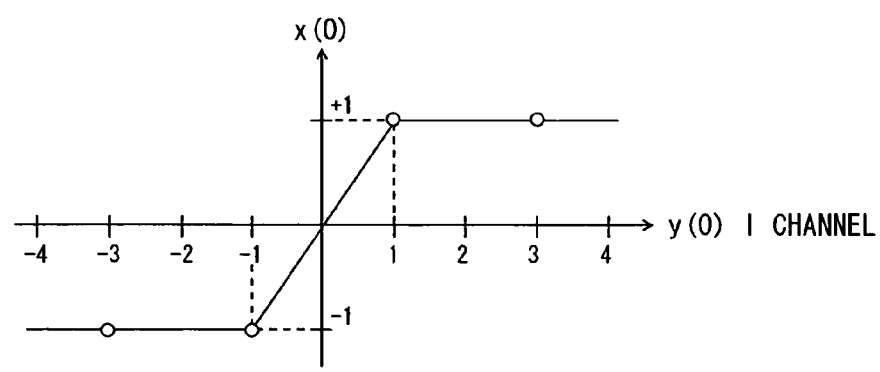
FIG. 13 is a view to describe a soft decision processing according to an embodiment of the invention.

As shown in Table 2 above, if the I channel of the first modulation signal y(0) changes in the sequence of −3, −1, 1, 3, the value of x(0) changes in the Sequence of −1, −1, 1, 1. FIG. 13 is a graph showing this relationship with the I channel of y(0) in the horizontal axis and x(0) in the vertical axis. Under ideal conditions with no noise or distortion, the I channel of the modulation signal Y(0) of the received subcarrier is located in the position indicated by a hollow circle in FIG. 13. It is thereby possible to immediately decide whether the demodulation data X(0) is 1 or −1. However, because an actual transmission path is affected by noise, interference and so on to cause a change in the phase of a subcarrier, the I channel of the modulation signal Y(0) of the received subcarrier is not exactly located in the position indicated by the hollow circle in FIG. 13. It is thus necessary to determine the demodulation data X(0) from the modulation signal Y(0) by setting soft decision conditions as shown in FIG. 10.

Referring back to FIG. 10, as the I channel of the modulation signal Y(0) increases from 0 to 1, the accuracy that the demodulation data is "1" increases accordingly. If input data, which is the I channel of the modulation signal Y(0), is larger than a prescribed value, the accuracy that the demodulation data is "1" stays at a constant value 1. As the input data decreases from 0 to −1, the accuracy that the demodulation data is −1 increases accordingly. In this way, the soft decision of input data is performed using the correlation between input data and demodulation data to thereby determine the demodulation data X(0) from the input data or the I channel of the modulation signal Y(0).

Figure 10:
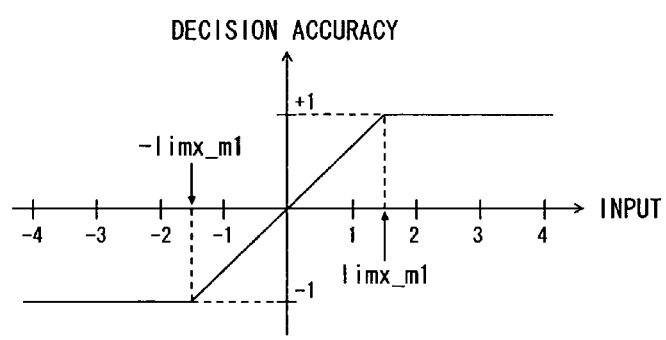
FIG. 10 is a view to describe a soft decision processing according to an embodiment of the invention.

In the graph of FIG. 10, the decision accuracy is 1 or −1 in the area where input is |limx_m1| or above. The value of limx_m1 is a threshold that is set according to the characteristics of a transmission path, required reception characteristics and so on. This is the same for limx_m2 and limx_m3 in FIGS. 11 and 12, which are described later.

Figure 11:
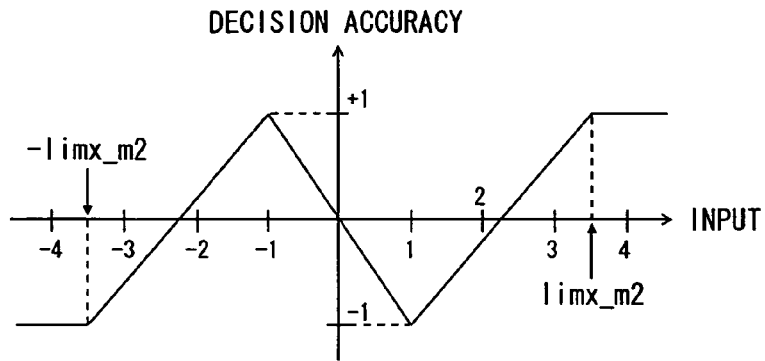
FIG. 11 is a view to describe a soft decision processing according to an embodiment of the invention.

A second soft decision circuit 302A receives the I channel of the first modulation signal Y(0) and decides the code of the demodulation data X(1) using a decision accuracy of a bipolar signal shown in FIG. 11.

Figure 14:
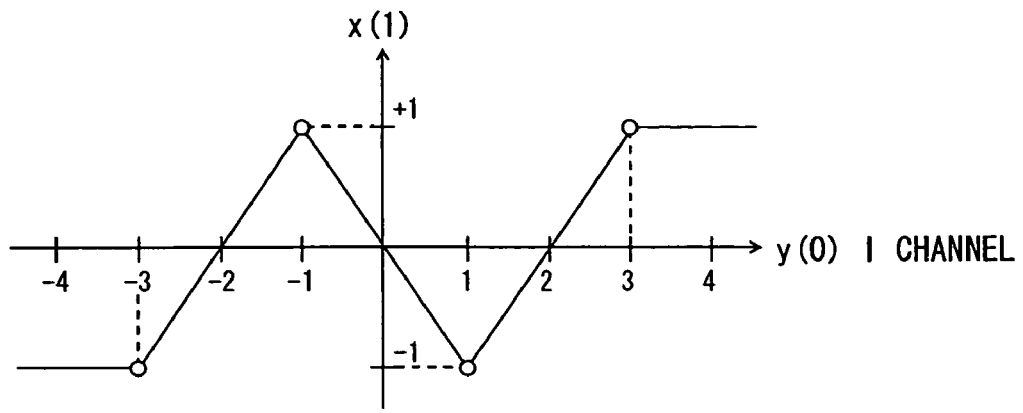
FIG. 14 is a view to describe a soft decision processing according to an embodiment of the invention.

As shown in Table 2 above, if the I channel of the modulation signal y(0) changes in the sequence of −3, −1, 1, 3, the value of x(1) changes in the sequence of −1, 1, −1, 1. FIG. 14 is a graph showing this relationship with the I channel of y(0) in the horizontal axis and x(1) in the vertical axis. Under ideal conditions with no noise or distortion, the I channel of the modulation signal Y(0) of the received subcarrier is located in the position indicated by a hollow circle in FIG. 14. It is thereby possible to immediately decide whether the demodulation data X(1) is 1 or −1. However, because an actual transmission path is affected by noise, interference and so on to cause a change in the phase of a subcarrier, the I channel of the modulation signal Y(0) of the received subcarrier is not exactly located in the position indicated by the hollow circle in FIG. 14. It is thus necessary to determine the demodulation data X(1) from the modulation signal Y(0) by setting soft decision conditions as shown in FIG. 11.

The operations of a first soft decision circuit 301B and a second soft decision circuit 302B are the same as the operations of the first soft decision circuit 301A and the second soft decision circuit 302A, respectively. The first soft decision circuit 301B decides the demodulation data X(2) from the Q channel of the modulation signal Y(0) using the decision accuracy shown in FIG. 10. The second soft decision circuit 302B decides the demodulation data X(3) from the Q channel of the modulation signal Y(0) using the decision accuracy shown in FIG. 11.

In this way, the 16-QAM demodulator 276 performs soft decision of input data on the I channel and Q channel of the first modulation signal Y(0) using the decision accuracy shown in FIGS. 10 and 11. The 4-bit demodulation data X(0) to X(3) corresponding to input data or the I channel and Q channel of the first modulation signal Y(0) are thereby determined.

Figure 8:
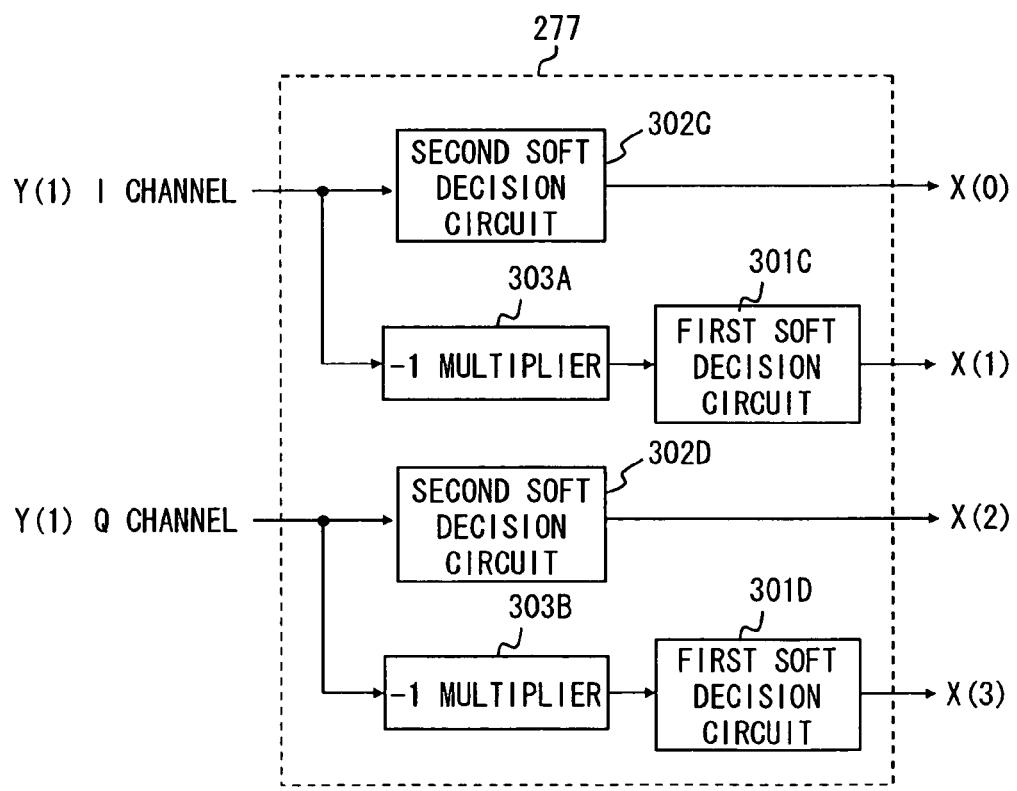
FIG. 8 is a block diagram showing a QAM demodulator according to an embodiment of the invention.

FIG. 8 is a block diagram showing the 16-QAM demodulator 277. A second soft decision circuit 302C decides the demodulation data X(0) from the I channel of the second modulation signal Y(1). A first soft decision circuit 301C decides the demodulation data X(1) from the I channel of the second modulation signal Y(1). A second soft decision circuit 302D decides the demodulation data X(2) from the Q channel of the second modulation signal Y(1) A first soft decision circuit 301D decides the demodulation data X(3) from the Q channel of the second modulation signal Y(1). The operations of the first soft decision circuits 301C and 301D are the same as the operation of the first soft decision circuit 301A described above. The operations of the second soft decision circuits 302C and 302D are the same as the operation of the second soft decision circuit 302A described above.

As shown in Table 4 above, if the I channel of the modulation signal y(1) changes in the sequence of −3, −1, 1, 3, the value of x(1) changes in the sequence of 1, 1, −1, −1. The correlation between the I channel of y(1) and x(1) is such that the polarity is decided in the correlation between the I channel of y(0) and x(0) in FIG. 13. Thus, a multiplier 303A is placed to perform conversion to create the same correlation as the one shown in FIG. 13 and decide the value of x(1). A multiplier 303B is placed for the same reason.

In this way, the 16-QAM demodulator 277 performs soft decision of input data for the I channel and Q channel of the second modulation signal Y(1) using the decision accuracy shown in FIGS. 10 and 11. The 4-bit demodulation data X(0) to X(3) corresponding to input data or the I channel and Q channel of the second modulation signal Y(1) are thereby determined.

Figure 9:
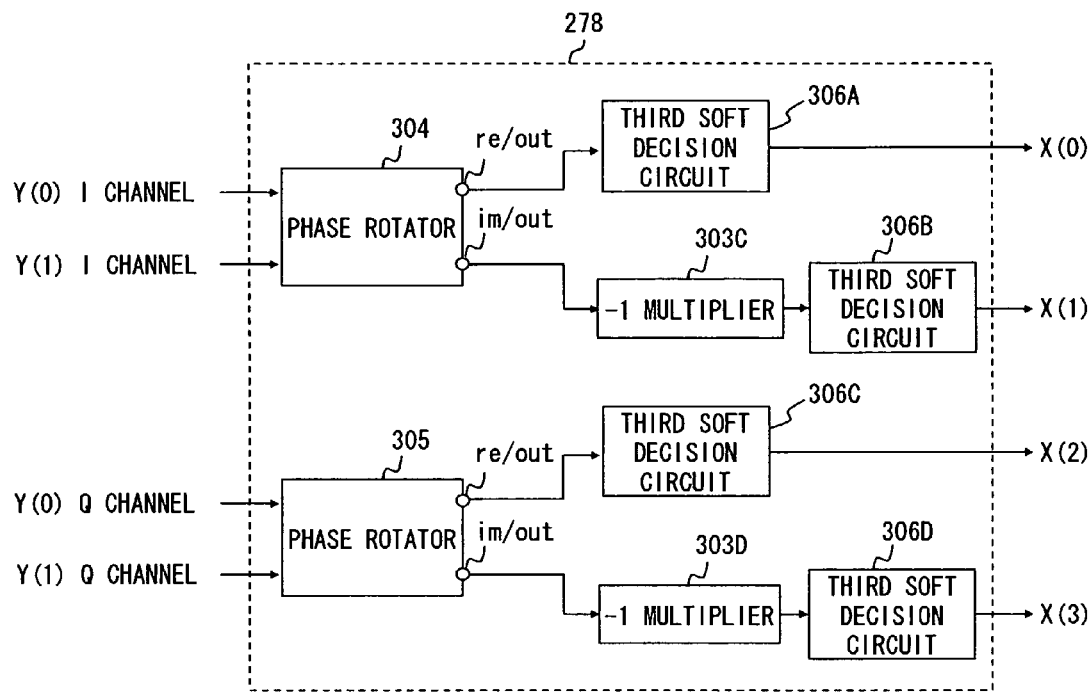
FIG. 9 is a block diagram showing a QPSK demodulator according to an embodiment of the invention.

Referring then to FIG. 9, the QPSK demodulator 278 is described herein. FIG. 9 is a block diagram showing the QPSK demodulator 278. In FIG. 9, a phase rotator 304 receives the I channel of the first modulation signal Y(0) and the I channel of the second modulation signal Y(1) and performs the calculation of the following Expression 5 on those inputs. The phase rotator 304 then outputs the real part of the calculation result through a re/out terminal and outputs the imaginary part of the calculation result through an im/out terminal. On the other hand, a phase rotator 305 receives the Q channel of the first modulation signal Y(0) and the Q channel of the second modulation signal Y(1) and performs the calculation of the following Expression 6 on those inputs. The phase rotator 305 then outputs the real part of the calculation result through a re/out terminal and outputs the imaginary part of the calculation result through an im/out terminal. In Expressions 5 and 6, $Y_I(0)$ represents the I channel of Y(0), $Y_I(1)$ represents the I channel of Y(1), $Y_Q(0)$ represents the Q channel of Y(0), and $Y_Q(1)$ represents the Q channel of Y(1).

$(Y_I(0)+jY_I(1))\times\exp\{-j(\arctan(3)-\pi/4)\}$  Expression 5

$(Y_Q(0)+jY_Q(1))\times\exp\{-j(\arctan(3)-\pi/4)\}$  Expression 6

As shown in Expression 5, the phase rotator 304 rotates the phase of a complex digital signal $Y_I(0)+jY_I(1)$ where the real part is the I channel of the first modulation signal Y(0) and the imaginary part is the I channel of the second modulation signal Y(1). As shown in Expression 6, the phase rotator 305 rotates the phase of a complex digital signal $Y_Q(0)+jY_Q(1)$ where the real part is the Q channel of the first modulation signal Y(0) and the imaginary part is the Q channel of the second modulation signal Y(1).

Figure 12:
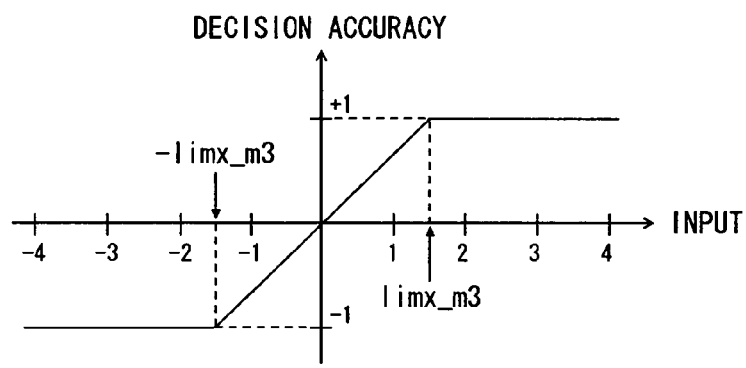
FIG. 12 is a view to describe a soft decision processing according to an embodiment of the invention.

In FIG. 9, a third soft decision circuit 306A receives the signal output from the re/out terminal of the phase rotator 304 and performs soft decision on the input data using the relationship between the input signal and the decision accuracy shown in FIG. 12 to thereby determine the demodulation data X(0) corresponding to the input data. A multiplier 303C multiplies the signal output from the im/out terminal of the phase rotator 304 by −1. A third soft decision circuit 306B receives the output from the multiplier 303C and performs soft decision on the input data using the relationship between the input signal and the decision accuracy shown in FIG. 12 to thereby determine the demodulation data X(1) corresponding to the input data.

A third soft decision circuit 306C receives the signal output from the re/out terminal of the phase rotator 305 and performs soft decision on the input data using the relationship between the input signal and the decision accuracy shown in FIG. 12 to thereby determine the demodulation data X(2) corresponding to the input data. A multiplier 303D multiplies the signal output from the im/out terminal of the phase rotator 305 by −1. A third soft decision circuit 306D receives the output from the multiplier 303D and performs soft decision on the input data using the relationship between the input signal and the decision accuracy shown in FIG. 12 to thereby determine the demodulation data X(3) corresponding to the input data.

Figure 15:
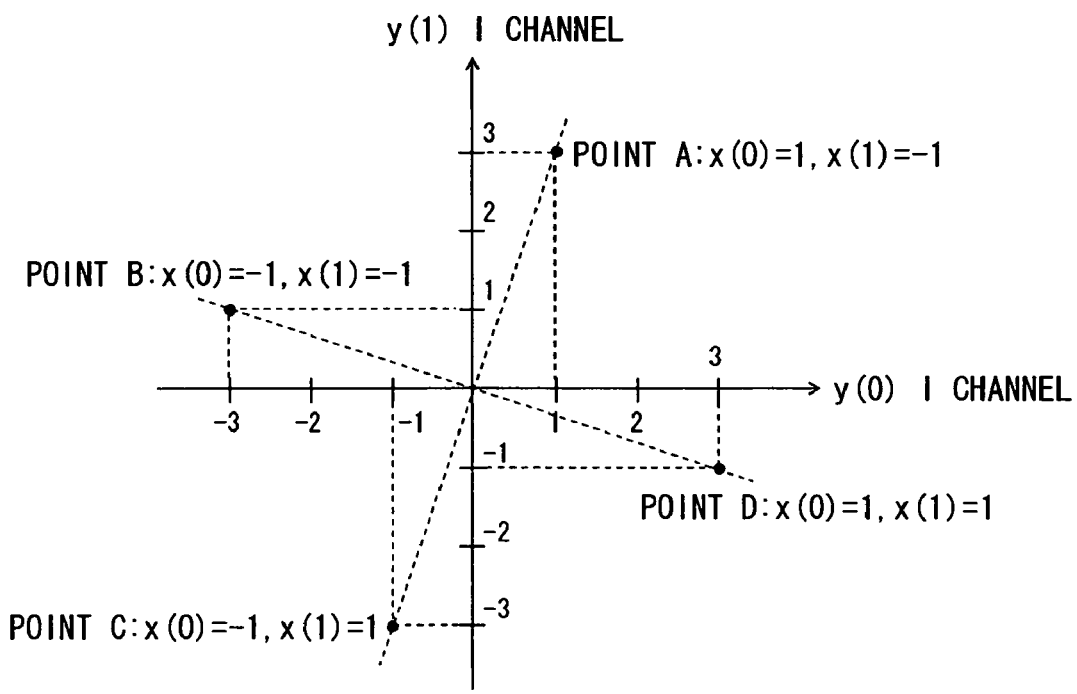
FIG. 15 is a view to describe the operation of a QPSK demodulator according to an embodiment of the invention.
Figure 16:
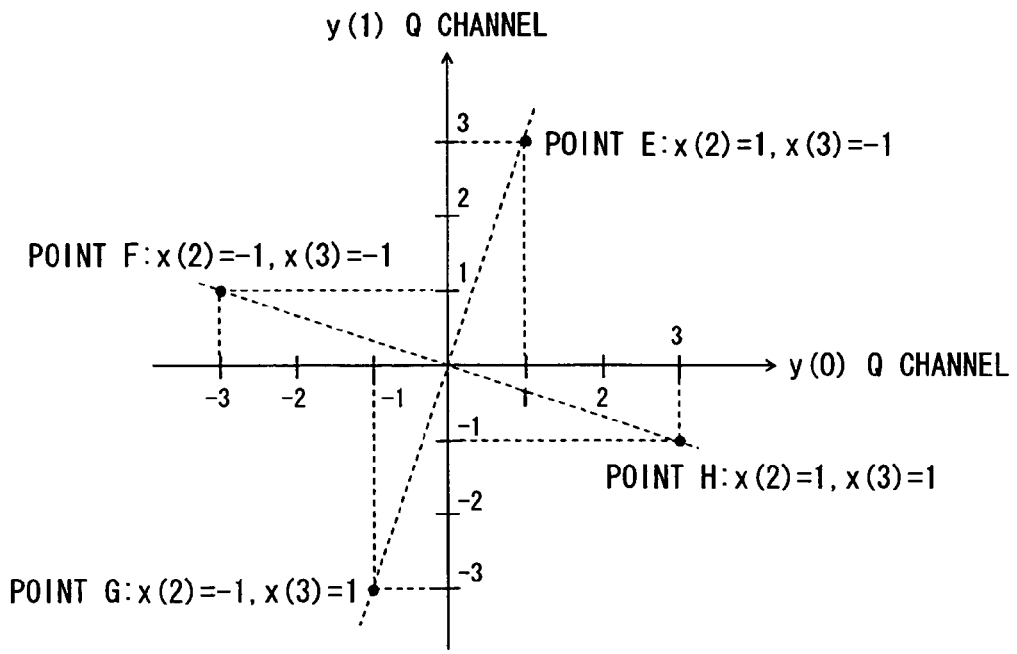
FIG. 16 is a view to describe the operation of a QPSK demodulator according to an embodiment of the invention.
Figure 17:
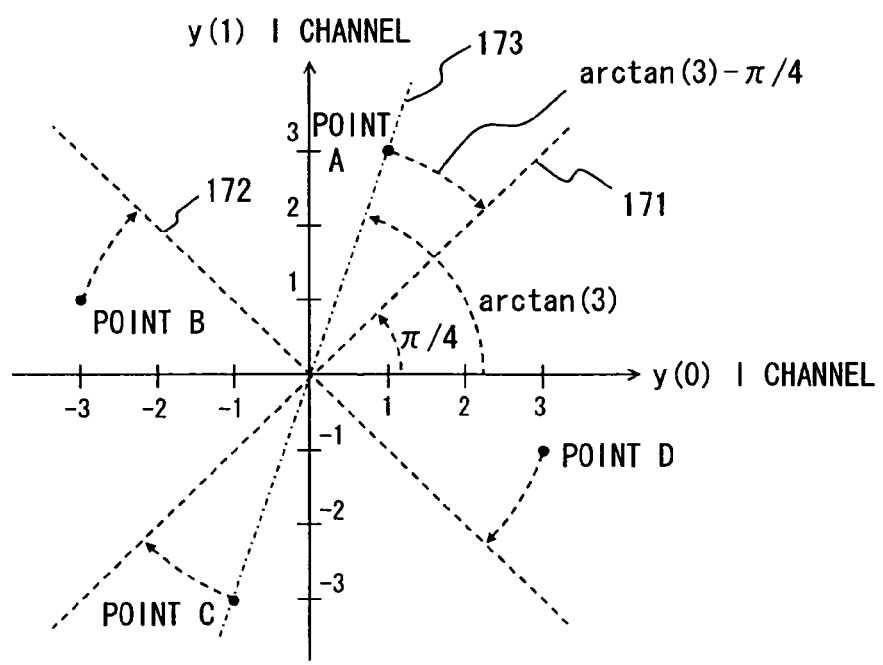
FIG. 17 is a view to describe a rotation operation performed by a QPSK demodulator according to an embodiment of the invention.

Referring then to FIGS. 15 to 17, the operation of the QPSK demodulator 278 is detailed hereinbelow. Table 6 and FIG. 15 show the relationship of x(0), x(1), I channel of a modulation signal y(0) and I channel of a modulation signal y(1) based on Tables 2 and 4. FIG. 15 shows a graph that plots the phase points A to D in the coordinate (x(0), x(1)) with the I channel of y(0) in the horizontal axis and I channel of y(1) in the vertical axis. As shown in FIG. 15, the phase points A to D are respectively located in the first to fourth quadrants.

TABLE 6

| x(0) | x(1) | y(0) I channel | y(1) I channel | Phase point |
|---|---|---|---|---|
| −1 | −1 | −3 | 1 | B |
| −1 | 1 | −1 | −3 | C |
| 1 | −1 | 1 | 3 | A |
| 1 | 1 | 3 | 1 | D |

Similarly, Table 7 and FIG. 16 show the relationship of x(2), x(3), Q channel of a modulation signal y(0) and Q channel of a modulation signal y(1) based on Tables 3 and 5. FIG. 16 shows a graph that plots the phase points E to H in the coordinate (x(2), x(3)) with the Q channel of y(0) in the horizontal axis and Q channel of y(1) in the vertical axis. As shown in FIG. 16, the phase points E to H are respectively located in the first to fourth quadrants.

TABLE 7

| x(2) | x(3) | y(0) I channel | y(1) I channel | Phase point |
|---|---|---|---|---|
| −1 | −1 | −3 | 1 | F |
| −1 | 1 | −1 | −3 | G |
| 1 | −1 | 1 | 3 | E |
| 1 | 1 | 3 | 1 | H |

As shown in FIG. 15, each of the points A to D is located in the position that is rotated by π/2 radian each about the origin of FIG. 15. The distance from each point A to D to the origin is equal. Therefore, appropriate rotation enables the regarding that 1-bit information x(0) is mapped on the phase of I channel of y(0), and 1-bit information x(1) is mapped on the phase of I channel of y(1). Thus, in terms of the phases of two I channels of two modulation signals y(0) and y(1), it is possible to perform demodulation by regarding them as QPSK signals.

Similarly, as shown in FIG. 16, each of the points E to H is located in the position that is rotated by π/2 radian each about the origin of FIG. 16. The distance from each point E to H to the origin is equal. Therefore, appropriate rotation enables the regarding that 1-bit information x(2) is mapped on the phase of Q channel of y(0), and 1-bit information x(3) is mapped on the phase of Q channel of y(1) Thus, in terms of the phases of two Q channels of two modulation signals y(0) and y(1), it is possible to perform demodulation by regarding them as QPSK signals.

As described in the foregoing, the demodulation apparatus 20 of this embodiment does not merely estimate 4-bit data for each 16-QAM-modulated subcarrier. It demodulates 2-bit data by QPSK demodulation utilizing the phases of two I channels of two 16-QAM-modulated subcarriers. It further demodulates 2-bit data by QPSK demodulation utilizing the phases of two Q channels of two 16-QAM-modulated subcarriers. As described above, QPSK demodulation is less affected by deterioration of S/N compared with 16-QAM demodulation.

The demodulation apparatus 20 of this embodiment is thus capable of suitable demodulation by suppressing deterioration in demodulation quality compared with a conventional demodulation apparatus that combines two diversity-received subcarriers by maximum ratio combining or equal gain combining and demodulates 4-bit data by 16-QAM, or a conventional demodulation apparatus that simply selects one from two subcarriers and demodulates 4-bit data by 16-QAM. It is capable of suitable demodulation by suppressing deterioration in demodulation quality particularly when equal level of quality deterioration occurs in two received subcarriers.

As described above, the demodulation apparatus of this embodiment is capable of appropriate switching of demodulation modes in accordance with transmission quality by comparing S/N of received subcarriers or the like. Therefore, it is possible to perform demodulation by eliminating a received subcarrier with deteriorated quality when there is a difference in quality among a plurality of received subcarriers and to perform demodulation by using a plurality of received subcarriers when there is no difference in quality among a plurality of received subcarriers. This enables generation of a suitable demodulation signal both when a signal quality deteriorates in the middle of a transmission path and when it does not deteriorate.

Further, the demodulation apparatus of this embodiment is capable of appropriate switching of demodulation modes according to an external control signal. It is thereby possible to quickly select an optimum demodulation mode in accordance with transmission environment.

Conventional multicarrier transmission using frequency diversity cannot switch demodulation modes of a receiving apparatus unless switching modulation modes for subcarriers in a transmission apparatus or applying different modulation modes to a plurality of subcarriers. Therefore, it requires a large circuit size due to redundancy in a modulator site in a transmitting end, a complicated control mechanism to use the same mode of modulation/demodulation in a transmission apparatus and a receiving apparatus, and so on.

On the other hand, the demodulation apparatus of this invention can appropriately select a modulation mode depending only on the decision by a receiving apparatus. This eliminates the need for a control to change a modulation modes in a transmission apparatus and a data transmission processing using a plurality of digital modulation modes with different number of data per symbol in a transmission apparatus, thus overcoming the drawbacks in the conventional multicarrier transmission.

The demodulation apparatus of the present invention allows a receiving apparatus to select a modulation mode with a less number of data per symbol than the number of data per symbol in a modulation mode used in a transmission apparatus. The demodulation apparatus further enables demodulation of a received signal by a suitable demodulation mode in terms of the quality of a demodulation signal. In addition, the demodulation apparatus eliminates the need for changing a modulation mode in a transmitting apparatus and data transmission using a plurality of digital modulation modes with different number of data per symbol.

Referring now to FIGS. 15 and 16, a distance from each of the phase points A to D and E to H to a coordinate axis is not equal. Therefore, the phase rotation due to the effect of noise or the like can cause a code error in demodulation. Further, because the points are not on the coordinate axis, a process of demapping is complicated. To address this concern, the phase rotator 304 in the QPSK demodulator 278 of this embodiment rotates the phase points A to D only by arctan (3)−π/4. As a result of this rotation, the phase points A to D are located on a line 171 that is at an angle of π/4 with the horizontal axis as I channel of y(0) or on a line 172 that is orthogonal to the line 171 as shown in FIG. 17.

The rotation operation by the phase rotator 304 is as below. The angle between the phase point A in line 173 and the horizontal axis is arctan (3), and the angle between the line 171 and the horizontal axis is π/4. Therefore, it is necessary to rotate the phase point A by arctan (3)−π/4 to place the phase point A on the line 171. The other phase points also moves onto the line 171 or 172 when rotated by the same angle. $Y_I(0)+jY_I(1)$ in Expression 5 represents the point on a complex plane composed of I channel of Y(0) and I channel of Y(1). Therefore, the above rotation can be implemented on the point on the complex plane composed of I channel of Y(0) and I channel of Y(1) by multiplying the point on the complex plane by an exponential function part indicating rotation, $\exp\{-j(\arctan(3)-\pi/4)\}$.

As a result of the above rotation, the phase points A to D after rotation can be expressed as the points with the coordinate value of 1 or −1 in a two-dimensional space where one coordinate axis is the I channel of Y(0) and the other coordinate axis is the I channel of Y(1). This enables simple decision similar to the soft decision described above with reference to FIGS. 9 and 10.

Similarly, the phase rotator 305 in the QPSK demodulator 278 rotates the phase points E to H so that each phase point is placed in the position at an equal distance from the vertical axis and the horizontal axis.

The structure of the demapping circuit 27 in the first embodiment is illustrative only. For example, it is possible to eliminate the unipolar converter 274 so that the first demodulator 270, the second demodulator 271 and the third demodulator 272 directly determine unipolar signals A(0) to A(3). It is also possible that the demapping circuit 27 does not perform parallel-serial conversion but outputs parallel data to the deinterleaver 28.

The combination of demodulation modes used in the demodulation apparatus 20 is not restricted to 16-QAM and QPSK as described above. For example, the first demodulator 270 and the second demodulator 271 may perform 16-QAM demodulation and the third demodulator 272 may perform π/4 shift QPSK demodulation. Further, the first demodulator 270 and the second demodulator 271 may perform QPSK demodulation and the third demodulator 272 may perform BPSK demodulation both on the signal that is QPSK modulated and transmitted through two subcarriers. Alternatively, the first demodulator 270 and the second demodulator 271 may perform 64-QAM demodulation and the third demodulator 272 may perform 8-QAM demodulation both on the signal that is 64-QAM modulated and transmitted through two subcarriers. Further alternatively, the first demodulator 270 and the second demodulator 271 may perform 256-QAM demodulation and the third demodulator 272 may perform 16-QAM demodulation both on the signal that is 256-QAM modulated and transmitted through two subcarriers.

A part of the functions of the demodulation apparatus 20 may be implemented by software. For example, the process of deciding demodulation data or rotating the phase that are performed in the first demodulator 270, the second demodulator 271 and the third demodulator 272 may be easily implemented by software.

In the above-described exemplary embodiment, the description is particularly given on the modulation and demodulation of two subcarriers to facilitate the description. However, it is obvious to those skilled in the art that the demodulation apparatus 20 is extended so as to receive other subcarriers as well when applying this invention to a multicarrier transmission method such as OFDM.

It is apparent that the present invention is not limited to the above embodiment that may be modified and changed without departing from the scope and spirit of the invention.

What is claimed is:

1. A demodulation apparatus comprising:
   a first demodulator for receiving a first received subcarrier and demodulating the first received subcarrier by a first demodulation mode;
   a second demodulator for receiving a second received subcarrier with a frequency range different from a frequency range of the first received subcarrier and demodulating the second received subcarrier by a second demodulation mode;
   a third demodulator for receiving the first received subcarrier and the second received subcarrier and demodulating a plurality of composite subcarriers obtained by combining the first received subcarrier and the second received subcarrier by a third demodulation mode different from the first demodulation mode and the second demodulation mode; and
   a selector for selecting and outputting demodulation data of one of the first to third demodulators.

2. The demodulation apparatus according to claim 1, wherein the number of bits demodulated from one symbol of one composite subcarrier by the third demodulation mode is smaller than the number of bits demodulated from one symbol of the first received subcarrier by the first demodulation mode and the number of bits demodulated from one symbol of the second received subcarrier by the second demodulation mode.

3. The demodulation apparatus according to claim 2, wherein the number of bits demodulated from one symbol of the first received subcarrier by the first demodulation mode is equal to the number of bits demodulated from one symbol of the second received subcarrier by the second demodulation mode.

4. The demodulation apparatus according to claim 1, wherein the first demodulator and the second demodulator perform QAM (Quadrature Amplitude Modulation) demodulation and the third demodulator performs one of QPSK (Quadrature Phase Shift Keying) demodulation, π/4 shift QPSK demodulation, and BPSK (Binary Phase Shift Keying) demodulation.

5. The demodulation apparatus according to claim 1, wherein the selector selects demodulation data of one of the first to third demodulators based on quality information on the first received subcarrier and the second received subcarrier.

6. The demodulation apparatus according to claim 1, wherein the selector selects one of demodulation data from the first demodulator and the second demodulator which is obtained by demodulating a received subcarrier with a larger signal-to-noise ratio when a difference or ratio of a signal-to-noise ratio of the first received subcarrier and a signal-to-noise ratio of the second received subcarrier is larger than a prescribed value and selects demodulation data from the third demodulator when the difference or ratio is smaller than the prescribed value.

7. The demodulation apparatus according to claim 1, wherein the selector selects one of demodulation data from the first demodulator and the second demodulator which is obtained by demodulating a received subcarrier with a larger received power when a difference or ratio of a received power of the first received subcarrier and a received power of the second received subcarrier is larger than a prescribed value and selects demodulation data from the third demodulator when the difference or ratio is smaller than the prescribed value.

8. The demodulation apparatus according to claim 1, wherein the selector selects and outputs demodulation data of one of the first to third demodulators according to a control signal superposed on at least one of the first received subcarrier and the second received subcarrier.

9. The demodulation apparatus according to claim 1, wherein the first demodulator performs 16-QAM demodulation and comprises:
   a first soft decision section for decoding an in-phase channel of the first received subcarrier by a first soft decision and outputting first demodulation data;
   a second soft decision section for decoding an in-phase channel of the first received subcarrier by a second soft decision and outputting second demodulation data;
   a third soft decision section for decoding a quadrature channel of the first received subcarrier by the same soft decision as the first soft decision and outputting third demodulation data; and
   a fourth soft decision section for decoding a quadrature channel of the first received subcarrier by the same soft decision as the second soft decision and outputting fourth demodulation data.

10. The demodulation apparatus according to claim 9, wherein the second demodulator performs 16-QAM demodulation and comprises:
    a fifth soft decision section for decoding an in-phase channel of the second received subcarrier by the same soft decision as the second soft decision and outputting fifth demodulation data;
    a sixth soft decision section for decoding a result of multiplying a signal of an in-phase channel of the second received subcarrier by −1 by the same soft decision as the first soft decision and outputting sixth demodulation data; and
    a seventh soft decision section for decoding a quadrature channel of the second received subcarrier by the same soft decision as the second soft decision and outputting seventh demodulation data; and
    an eighth soft decision section for decoding a result of multiplying a signal of a quadrature channel of the second received subcarrier by −1 by the same soft decision as the first soft decision and outputting eighth demodulation data.

11. The demodulation apparatus according to claim 10, wherein the third demodulator performs QPSK demodulation and comprises:
    a ninth soft decision section for deciding and outputting ninth demodulation data by a phase of an in-phase channel of the first received subcarrier;
    a tenth soft decision section for deciding and outputting tenth demodulation data by a phase of an in-phase channel of the second received subcarrier;
    an eleventh soft decision section for deciding and outputting eleventh demodulation data by a phase of a quadrature channel of the first received subcarrier; and
    a twelfth soft decision section for deciding and outputting twelfth demodulation data by a phase of a quadrature channel of the second received subcarrier.

12. The demodulation apparatus according to claim 1, wherein the third demodulator comprises:
    a first phase rotator for outputting a real part and an imaginary part obtained by rotation of a coordinate point indicating a received signal to a position at an equal distance from two coordinate axes on a first complex plane, one coordinate axis being an in-phase channel of the first received subcarrier and another coordinate axis being an in-phase channel of the second received subcarrier;

a second phase rotator for outputting a real part and an imaginary part obtained by rotation of a coordinate point indicating a received signal to a position at an equal distance from two coordinate axes on a second complex plane, one coordinate axis being a quadrature channel of the first received subcarrier and another coordinate axis being a quadrature channel of the second received subcarrier;

a first soft decision section for decoding the real part output from the first phase rotator by soft decision and outputting first demodulation data;

a second soft decision section for decoding a result of multiplying the imaginary part output from the first phase rotator by −1 by the soft decision and outputting second demodulation data subsequent to the first demodulation data;

a third soft decision section for decoding the real part output from the second phase rotator by the soft decision and outputting third demodulation data separated from the first demodulation data by a prescribed value; and a fourth soft decision section for decoding a result of multiplying the imaginary part output from the second phase rotator by −1 by the soft decision and outputting fourth demodulation data subsequent to the third demodulation data.

13. The demodulation apparatus according to claim 1, wherein the third demodulator comprises:

a first phase rotator for rotating a phase of a first complex signal having an in-phase channel of the first received subcarrier as a real part and an in-phase channel of the second received subcarrier as an imaginary part;

a second phase rotator for rotating a phase of a second complex signal having a quadrature channel of the first received subcarrier as a real part and a quadrature channel of the second received subcarrier as an imaginary part;

a first soft decision section for outputting first demodulation data based on a result of soft decision on the real part of the first complex signal rotated by the first phase rotator;

a second soft decision section for outputting second demodulation data based on a result of soft decision on the imaginary part of the first complex signal rotated by the first phase rotator;

a third soft decision section for outputting third demodulation data based on a result of soft decision on the real part of the second complex signal rotated by the second phase rotator; and a fourth soft decision section for outputting fourth demodulation data based on a result of soft decision on the imaginary part of the second complex signal rotated by the second phase rotator.

14. The demodulation apparatus according to claim 9, wherein the first soft decision section comprises:

determining the first demodulation data as 1 when the in-phase channel of the first received subcarrier is larger than a first threshold, determining the first demodulation data as −1 when the in-phase channel of the first received subcarrier is smaller than a second negative threshold, and determining the first demodulation data to exhibit monotone increase from −1 to 1 when the in-phase channel of the first received subcarrier is between the second negative threshold and the first threshold.

15. The demodulation apparatus according to claim 9, wherein the second soft decision section comprises:

determining the first demodulation data as −1 when the in-phase channel of the first received subcarrier is smaller than a first negative threshold, determining the first demodulation data to exhibit monotone increase from −1 to 1 when the in-phase channel of the first received subcarrier is larger than the first negative threshold and smaller than a second negative threshold, determining the first demodulation data to exhibit monotone decrease from 1 to −1 when the in-phase channel of the first received subcarrier is larger than the second negative threshold and smaller than a first positive threshold, determining the first demodulation data to exhibit monotone increase from −1 to 1 when the in-phase channel of the first received subcarrier is larger than the first positive threshold and smaller than a second positive threshold, and determining the first demodulation data as 1 when the in-phase channel of the first received subcarrier is larger than the second positive threshold.

16. The demodulation apparatus according to claim 12, wherein an angle of phase rotation by the first phase rotator and the second phase rotator is $\pi/4$.

17. A demodulation method comprising:

receiving a first received subcarrier and a second received subcarrier with a frequency range different from a frequency range of the first received subcarrier;

demodulating the first received subcarrier by a first demodulation mode;

demodulating the second received subcarrier by a second demodulation mode;

demodulating a plurality of composite subcarriers obtained by combining the first received subcarrier and the second received subcarrier by a third demodulation mode different from the first demodulation mode and the second demodulation mode; and selecting and outputting demodulation data demodulated by one of the first to third modes.

18. The demodulation method according to claim 17, wherein the number of bits demodulated from one symbol of one composite subcarrier by the third demodulation mode is smaller than the number of bits demodulated from one symbol of the first received subcarrier by the first demodulation mode and the number of bits demodulated from one symbol of the second received subcarrier by the second demodulation mode.

19. The demodulation method according to claim 18, wherein the number of bits demodulated from one symbol of the first received subcarrier by the first demodulation mode is equal to the number of bits demodulated from one symbol of the second received subcarrier by the second demodulation mode.

20. The demodulation method according to claim 17, wherein the selection of demodulation data is made based on quality information on the first received subcarrier and the second received subcarrier.

21. The demodulation method according to claim 17, wherein the selection of demodulation data is made according to a control signal superposed on at least one of the first received subcarrier and the second received subcarrier.

22. The demodulation method according to claim 17, wherein the first demodulation mode and the second demodulation mode are 16-QAM demodulation, and the third demodulation mode is QPSK demodulation, and the third demodulation mode comprises:
determining first demodulation data by a phase of an in-phase channel of the first received subcarrier,
determining second demodulation data by a phase of an in-phase channel of the second received subcarrier,
determining third demodulation data by a phase of a quadrature channel of the first received subcarrier, and
determining fourth demodulation data by a phase of a quadrature channel of the second received subcarrier.

23. The demodulation method according to claim 17, wherein the first demodulation mode and the second demodulation mode are 16-QAM demodulation, and the third demodulation mode is QPSK demodulation, and
the third demodulation mode comprises:
rotating a phase of a first complex signal having an in-phase channel of the first received subcarrier as a real part and an in-phase channel of the second received subcarrier as an imaginary part;
rotating a phase of a second complex signal having a quadrature channel of the first received subcarrier as a real part and a quadrature channel of the second received subcarrier as an imaginary part;
determining first demodulation data based on a result of soft decision on the real part of the rotated first complex signal;
determining second demodulation data based on a result of soft decision on the imaginary part of the rotated first complex signal;
determining third demodulation data based on a result of soft decision on the real part of the rotated second complex signal; and
determining fourth demodulation data based on a result of soft decision on the imaginary part of the rotated second complex signal.

* * * * *